US008782371B2

(12) United States Patent
Prebble

(10) Patent No.: US 8,782,371 B2
(45) Date of Patent: Jul. 15, 2014

(54) SYSTEMS AND METHODS FOR MEMORY MANAGEMENT FOR RASTERIZATION

(75) Inventor: Tim Prebble, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 880 days.

(21) Appl. No.: 12/059,692

(22) Filed: Mar. 31, 2008

(65) Prior Publication Data

US 2009/0249017 A1   Oct. 1, 2009

(51) Int. Cl.
 *G06F 13/00* (2006.01)
 *G06F 13/28* (2006.01)
(52) U.S. Cl.
 USPC ............... 711/170; 711/E12.002; 711/133; 710/56
(58) Field of Classification Search
 USPC .......................................................... 710/56
 See application file for complete search history.

(56) References Cited

U.S. PATENT DOCUMENTS

| 4,782,398 | A | 11/1988 | Mita |
| 5,010,515 | A | 4/1991 | Torborg et al. |
| 5,041,920 | A | 8/1991 | Hayes et al. |
| 5,319,778 | A | 6/1994 | Catino |
| 5,471,579 | A | 11/1995 | Kimura et al. |
| 5,477,257 | A | 12/1995 | Murata |
| 5,479,587 | A | 12/1995 | Campbell et al. |
| 5,491,808 | A | 2/1996 | Geist, Jr. |
| 5,502,462 | A | 3/1996 | Mical et al. |
| 5,542,031 | A | 7/1996 | Douglass et al. |
| 5,577,243 | A | * 11/1996 | Sherwood et al. ............ 1/1 |
| 5,646,670 | A | 7/1997 | Seto et al. |
| 5,739,842 | A | 4/1998 | Murata |
| 5,760,811 | A | 6/1998 | Seto et al. |
| 5,778,414 | A | 7/1998 | Winter et al. |
| 5,793,937 | A | 8/1998 | Chura et al. |
| 5,864,342 | A | 1/1999 | Kajiya et al. |
| 5,870,534 | A | 2/1999 | Tsuchitoi |

(Continued)

FOREIGN PATENT DOCUMENTS

| JP | 2-275525 | 11/1990 |
| JP | 2000141811 A | 5/2000 |

(Continued)

OTHER PUBLICATIONS

U.S. Appl. No. 12/059,627, filed Mar. 31, 2008.

(Continued)

*Primary Examiner* — Edward Dudek, Jr.
(74) *Attorney, Agent, or Firm* — Osha Liang LLP

(57) ABSTRACT

Methods for managing a single memory pool comprising frame buffer memory and display list memory are presented. The single memory pool can comprise sub-pools including: a super-block pool comprising a plurality of super-block objects; a node pool comprising a plurality of node objects; and a block-pool comprising a plurality of blocks. The method may comprise: receiving a memory allocation request directed to at least one of the sub-pools; allocating an object local to the sub-pool identified in the memory request, if local sub-pool objects are available to satisfy the memory request; allocating an object from super-block pool, if the memory request is directed to the node-pool or block-pool and there are no available local objects in the respective sub-pools to satisfy the memory request; and applying at least one of a plurality of memory freeing strategies, if the sub-pools lack available free objects.

23 Claims, 8 Drawing Sheets

(56) References Cited

U.S. PATENT DOCUMENTS

| | | |
|---|---|---|
| 5,913,018 A | 6/1999 | Sela |
| 5,946,334 A | 8/1999 | Ema et al. |
| 5,959,867 A | 9/1999 | Speciner et al. |
| 5,978,893 A * | 11/1999 | Bakshi et al. ............... 711/171 |
| 5,999,709 A | 12/1999 | Fiala et al. |
| 6,031,995 A | 2/2000 | George |
| 6,040,917 A | 3/2000 | Campbell et al. |
| 6,057,847 A | 5/2000 | Jenkins |
| 6,092,171 A | 7/2000 | Relph |
| 6,111,582 A | 8/2000 | Jenkins |
| 6,192,157 B1 | 2/2001 | Prebble |
| 6,215,513 B1 | 4/2001 | Ashikaga |
| 6,249,793 B1 | 6/2001 | Printezis et al. |
| 6,252,675 B1 | 6/2001 | Jacobs |
| 6,326,964 B1 | 12/2001 | Snyder et al. |
| 6,366,289 B1 | 4/2002 | Johns |
| 6,369,911 B1 | 4/2002 | Hattori |
| 6,472,946 B2 | 10/2002 | Takagi |
| 6,476,847 B2 | 11/2002 | Satoh et al. |
| 6,490,670 B1 * | 12/2002 | Collins et al. ............... 711/173 |
| 6,498,617 B1 | 12/2002 | Ishida et al. |
| 6,603,116 B2 | 8/2003 | Niito |
| 6,643,759 B2 | 11/2003 | Andersson et al. |
| 6,701,420 B1 | 3/2004 | Hamilton et al. |
| 6,707,563 B1 | 3/2004 | Barry et al. |
| 6,731,317 B2 | 5/2004 | Ema et al. |
| 6,775,032 B2 | 8/2004 | Jacobs |
| 6,778,292 B1 | 8/2004 | Someno |
| 6,809,730 B2 | 10/2004 | Howson |
| 6,860,203 B2 | 3/2005 | Danilo et al. |
| 7,009,729 B2 | 3/2006 | Fujita |
| 7,031,025 B1 | 4/2006 | He et al. |
| 7,038,671 B2 | 5/2006 | Willis et al. |
| 7,064,859 B1 | 6/2006 | Dittrich et al. |
| 7,113,302 B2 | 9/2006 | Reddy et al. |
| 7,196,710 B1 | 3/2007 | Fouladi et al. |
| 7,428,075 B2 | 9/2008 | Johnston |
| 7,447,836 B2 | 11/2008 | Zhang et al. |
| 7,697,168 B2 | 4/2010 | Ozawa et al. |
| 7,715,031 B2 | 5/2010 | Westervelt et al. |
| 8,045,215 B2 | 10/2011 | Jacobsen et al. |
| 8,228,555 B2 | 7/2012 | Prebble |
| 8,526,049 B2 | 9/2013 | Guarnieri |
| 2001/0015820 A1 | 8/2001 | Conrad et al. |
| 2001/0030769 A1 | 10/2001 | Jacobs |
| 2001/0030796 A1 | 10/2001 | Yao |
| 2001/0055129 A1 | 12/2001 | Shimizu |
| 2002/0063894 A1 | 5/2002 | Campbell et al. |
| 2002/0078298 A1 * | 6/2002 | Jeddeloh ............... 711/118 |
| 2002/0093669 A1 | 7/2002 | Campbell et al. |
| 2002/0097433 A1 | 7/2002 | Chang et al. |
| 2002/0120826 A1 | 8/2002 | Venkatraman et al. |
| 2004/0044873 A1 | 3/2004 | Wong et al. |
| 2004/0098544 A1 | 5/2004 | Gaither et al. |
| 2004/0120007 A1 | 6/2004 | Jacobsen et al. |
| 2004/0156079 A1 | 8/2004 | Marshall et al. |
| 2004/0193775 A1 | 9/2004 | Van Doren et al. |
| 2004/0207861 A1 | 10/2004 | Hattori |
| 2004/0233207 A1 | 11/2004 | Morphet |
| 2005/0044549 A1 | 2/2005 | Morikawa et al. |
| 2005/0067498 A1 | 3/2005 | Smith |
| 2006/0001467 A1 | 1/2006 | Fujino et al. |
| 2006/0069898 A1 | 3/2006 | Patel et al. |
| 2006/0077193 A1 | 4/2006 | Thielemans et al. |
| 2006/0288187 A1 | 12/2006 | Burugula et al. |
| 2007/0146785 A1 | 6/2007 | Akiyama et al. |
| 2007/0153247 A1 | 7/2007 | Nagasaka |
| 2007/0229900 A1 | 10/2007 | Guarnieri et al. |
| 2007/0236733 A1 * | 10/2007 | Guarnieri et al. ............ 358/1.16 |
| 2008/0002018 A1 | 1/2008 | Johnston |
| 2008/0002228 A1 | 1/2008 | Johnston |
| 2008/0002229 A1 | 1/2008 | Johnston |
| 2008/0007744 A1 | 1/2008 | Johnston |
| 2008/0007745 A1 | 1/2008 | Johnston |
| 2008/0162863 A1 * | 7/2008 | McClure et al. ............... 711/171 |
| 2009/0086254 A1 | 4/2009 | Duong |
| 2009/0172336 A1 * | 7/2009 | Schmidt ................... 711/170 |
| 2009/0244593 A1 | 10/2009 | Prebble |
| 2010/0053179 A1 | 3/2010 | Bellert |
| 2010/0060934 A1 | 3/2010 | Bellert |
| 2010/0079809 A1 | 4/2010 | Bellert |

FOREIGN PATENT DOCUMENTS

| | | |
|---|---|---|
| JP | 2004038527 A | 2/2004 |
| JP | 2004054933 A | 2/2004 |
| JP | 2005-73004 | 3/2005 |
| JP | 2005-190487 | 7/2005 |
| JP | 2005327255 A | 11/2005 |
| JP | 2009-245437 | 10/2009 |

OTHER PUBLICATIONS

U.S. Appl. No. 11/394,783, filed Mar. 31, 2006.
Office Action dated Aug. 18, 2009, in related U.S. Appl. No. 11/394,783, filed Mar. 31, 2006, Stuart Guarnieri.
Office Action dated Apr. 13, 2010, in related U.S. Appl. No. 11/394,783, filed Mar. 31, 2006, Stuart Guarnieri.
Office Action dated Nov. 26, 2010, in related U.S. Appl. No. 11/394,783, filed Mar. 31, 2006, Stuart Guarnieri.
U.S. Appl. No. 11/515,337, filed Aug. 31, 2006.
Office Action dated May 23, 2011, in related U.S. Appl. No. 11/394,783, filed Mar. 31, 2006, Stuart Guarnieri.
Office Action dated Mar. 21, 2011, in related U.S. Appl. No. 11/515,337, filed Aug. 31, 2006, Stuart Guarnieri.
Notification of Reasons for Refusal mailed by the Japanese Patent Office on Feb. 19, 2013, in Japanese patent application No. 2009-081519.
Notice of Rejection mailed by the Japanese Patent Office on Jul. 16, 2013, in Japanese patent application No. 2009-192942.
Notice of Rejection mailed by the Japanese Patent Office on Jun. 18, 2013, in Japanese patent application No. 2009-222772.
Advisory Action for U.S. Appl. No. 12/201,735 dated Aug. 21, 2013.
Final Office Action for U.S. Appl. No. 12/209,046 dated Sep. 27, 2013.
Final Office Action for U.S. Appl. No. 12/242,668 dated Nov. 27, 2013.
Notice of Abandonment for U.S. Appl. No. 11/515,337 dated Dec. 16, 2013.
Notice of Allowance for U.S. Appl. No. 11/394,783 dated Apr. 22, 2013.
Notification of Refusal with English language translation for JP Patent Application No. 2009-192942 dated Oct. 29, 2013.
Notification of Refusal with English language translation for JP Patent Application No. 2009-206817 dated Dec. 10, 2013.
Non-final Office Action for U.S. Appl. No. 12/209,046 dated Apr. 19, 2013.
Non-final Office Action for U.S. Appl. No. 11/515,337 dated Jun. 10, 2013.
Non-final Office Action for U.S. Appl. No. 12/242,668 dated Jun. 14, 2013.
Non-final Office Action for U.S. Appl. No. 12/201,735 dated Dec. 3, 2013.

* cited by examiner

SYSTEMS AND METHODS FOR MEMORY MANAGEMENT FOR RASTERIZATION

BACKGROUND

1. Field of the Invention

The present invention relates to the field of printing and in particular, to systems and methods for memory management for rasterization.

2. Description of Related Art

Document processing software allows users to view, edit, process, and store documents conveniently. Pages in a document may be displayed on screen exactly as they would appear in print. However, before the document can be printed, pages in the document are often described in a page description language ("PDL"). As used in this document PDL's may include PostScript, Adobe PDF, HP PCL, Microsoft XPS, and variants thereof as well as any other languages used to describe pages in a document. A PDL description of a document provides a high-level description of each page in a document. This PDL description is often translated to a series of lower-level printer-specific commands when the document is being printed. The process of translation from a PDL description of a document to a lower-level description that may be used to place marks on a print medium is termed rasterization.

The translation process from PDL to lower-level printer-specific commands may be complex and depend on the features and capabilities offered by a particular printer. Flexible and portable general-purpose schemes to translate PDL descriptions of documents to printer-specific commands may allow for the optimization of printer performance based on available memory, desired print speed, and other cost and performance criteria.

Traditionally, memory in printing systems has been organized in two distinct pools comprising the display list memory and the frame buffer memory. Display list memory typically holds display list objects for rasterization, while the frame buffer memory typically holds bitmapped data specifying marks to be made on a printed page. The use of separate memory pools prevents the use of display list memory for frame buffer purposes, and vice versa. Print failures can occur due to insufficient memory in either pool. In such situations, there may be sufficient extra memory in the one pool, but the memory is unavailable for use in the other memory pool because of the separate nature of the two pools. Moreover, the use of separate memory management routines to manage display list and frame buffer memory pools may make it difficult to modify and maintain the code used to manage memory across a product family because different strategies and optimizations may be used in individual products. For example, when display list memory is exhausted, one product may trigger pre-rasterization, whereas another product may swap display list memory to disk. The lack of uniformity and the often disparate assortment of memory management routines implemented greatly increases the difficulty of rolling out updates, and improving functionality and performance.

Thus, there is a need for systems and methods to manage memory on printers for rasterization that would allow a seamless upgrade path, while providing additional optimizations.

SUMMARY

Consistent with disclosed embodiments, systems and methods for managing a single memory pool comprising frame buffer memory and display list memory are presented. In some embodiments, the single memory pool can comprise sub-pools including: a super-block pool comprising a plurality of super-block objects; a node pool comprising a plurality of node objects; and a block-pool comprising a plurality of blocks. The method may comprise: receiving a memory allocation request directed to at least one of the sub-pools; allocating an object local to the sub-pool in response to the memory request, if local objects are available in the sub-pool to satisfy the memory request; allocating an object from super-block pool in response to the memory request, if the memory request is directed to the node-pool or the block-pool and there are no available local objects in the respective sub-pools to satisfy the memory request; and applying at least one of a plurality of memory freeing strategies, if there are no free objects available in any of the sub-pools.

Embodiments also relate to methods created, stored, accessed, or modified by processors using computer-readable media or computer-readable memory.

These and other embodiments are further explained below with respect to the following figures.

DETAILED DESCRIPTION

In accordance with embodiments reflecting various features of the present invention, systems and methods for the automatic storing, manipulating, and processing of a second or intermediate form of printable data generated from a first printable data are presented. In some embodiments, the first printable data may take the form of a PDL description of a document and the intermediate printable data may take the form of a display list of objects generated from the PDL description.

Figure 1:
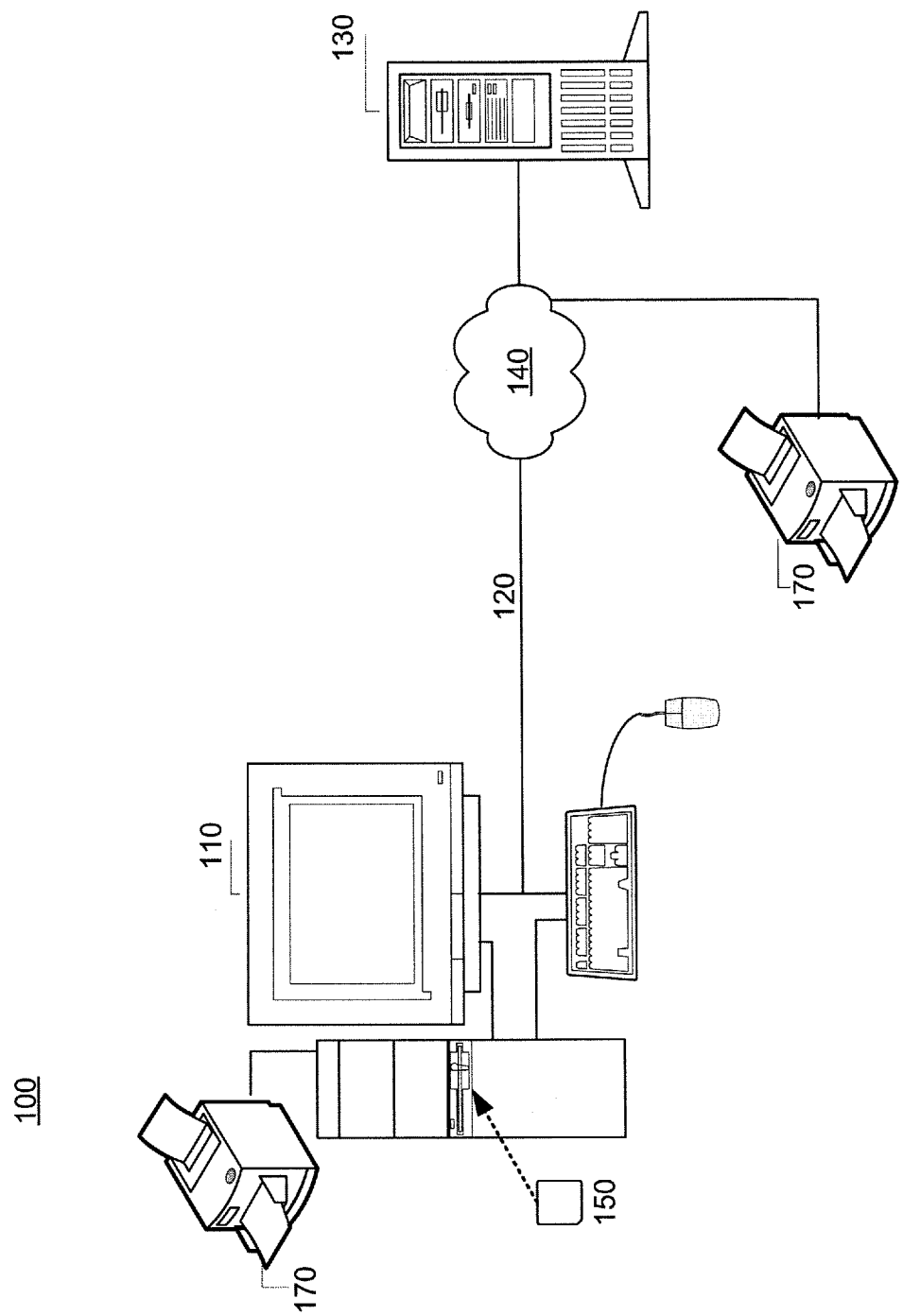
FIG. 1 shows a block diagram illustrating components in a system for printing documents according to some embodiments.

FIG. 1 shows a block diagram illustrating components in a system for printing documents according to some embodiments of the present invention. A computer software application consistent with the present invention may be deployed on a network of computers, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Exemplary printer 170 includes devices that produce physical documents from electronic data including, but not limited to, laser printers, ink-jet printers, LED printers, plotters, facsimile machines, and digital copiers. In some embodiments, printer 170 may also be capable of directly printing documents received from computing device 110 or server 130 over connection 120. In some embodiments such an arrangement may allow for the direct printing of documents, with (or without) additional processing by computing device 110 or server 130. In some embodiments, documents may contain one or more of text, graphics, and images. In some embodiments, printer 170 may receive PDL descriptions of documents for printing. Note, too, that document print processing can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. In some embodiments, portions of the software application may reside on removable media and be read and executed by computing device 110 using removable media drive 150.

Connection 120 couples computing device 110, server 130, and printer 170 and may be implemented as a wired or wireless connection using conventional communication protocols and/or data port interfaces. In general, connections 120 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection. In some embodiments, connection 120 may be a Digital Subscriber Line (DSL), an Asymmetric Digital Subscriber Line (ADSL), or a cable connection. The communication links could be wireless links or wired links or any combination consistent with embodiments of the present invention that allows communication between the various devices.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. In some embodiments, printer 170 may also be connected directly to computing device 110 and/or server 130. System 100 may also include other peripheral devices (not shown), according to some embodiments of the present invention. A computer software application consistent with the present invention may be deployed on any of the exemplary computers, as shown in FIG. 1. For example, computing device 110 could execute software that may be downloaded directly from server 130. Portions of the application may also be executed by printer 170 in accordance with some embodiments of the present invention.

Figure 2:
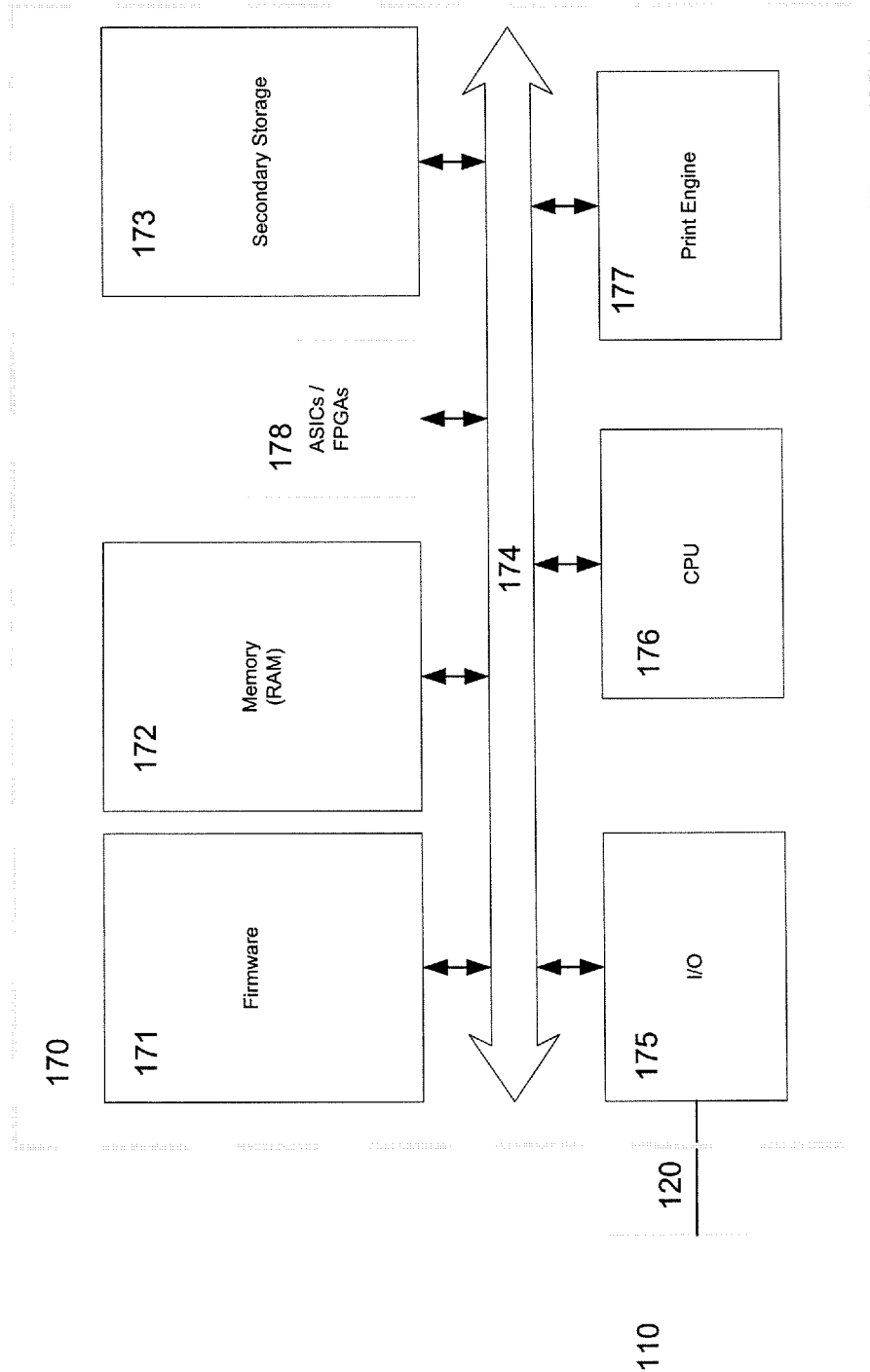
FIG. 2 shows a high level block diagram of an exemplary printer.

FIG. 2 shows a high-level block diagram of exemplary printer 170. In some embodiments, printer 170 may contain bus 174 that couples CPU 176, firmware 171, memory 172, input-output ports 175, print engine 177, and secondary storage device 173. Printer 170 may also contain other Application Specific Integrated Circuits (ASICs), and/or Field Programmable Gate Arrays (FPGAs) 178 that are capable of executing portions of an application to print documents according to some embodiments of the present invention. In some embodiments, printer 170 may also be able to access secondary storage or other memory in computing device 110 using I/O ports 175 and connection 120. In some embodiments, printer 170 may also be capable of executing software including a printer operating system and other appropriate application software. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines, and other code. In some embodiments, code and data in firmware 171 may be copied to memory 172 prior to being acted upon by CPU 176. Routines in firmware 171 may include code to translate page descriptions received from computing device 110 to display lists and image bands. In some embodiments, firmware 171 may include rasterization routines to convert display commands in a display list to an appropriate rasterized bit map and store the bit map in memory 172. Firmware 171 may also include compression routines and memory management routines. In some embodiments, data and instructions in firmware 171 may be upgradeable.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and rasterization algorithms. In some embodiments, computing device 110 can transform document data into a first printable data. Then, the first printable data can be sent to printer 170 for transformation into intermediate printable data. Printer 170 may transform intermediate printable data into a final form of printable data and print according to this final form. In some embodiments, the first printable data may correspond to a PDL description of a document. In some embodiments, the translation process from a PDL description of a document to the final printable data comprising of a series of lower-level printer-specific commands may include the generation intermediate printable data comprising of display lists of objects.

In some embodiments, display lists may hold one or more of text, graphics, and image data objects. In some embodiments, objects in display lists may correspond to similar objects in a user document. In some embodiments, display lists may aid in the generation of intermediate printable data. In some embodiments, display lists may be stored in memory 172 or secondary storage 173. Exemplary secondary storage 173 may be an internal or external hard disk, memory stick, or any other memory storage device capable of being used by printer 170. In some embodiments, the display list may reside one or more of printer 170, computing device 110, and server 130. Memory to store display lists may be a dedicated memory or form part of general purpose memory, or some combination thereof according to some embodiments of the present invention. In some embodiments, memory may be dynamically allocated to hold display lists as needed. In some embodiments, memory allocated to store display lists may be dynamically released after processing.

Figure 3:
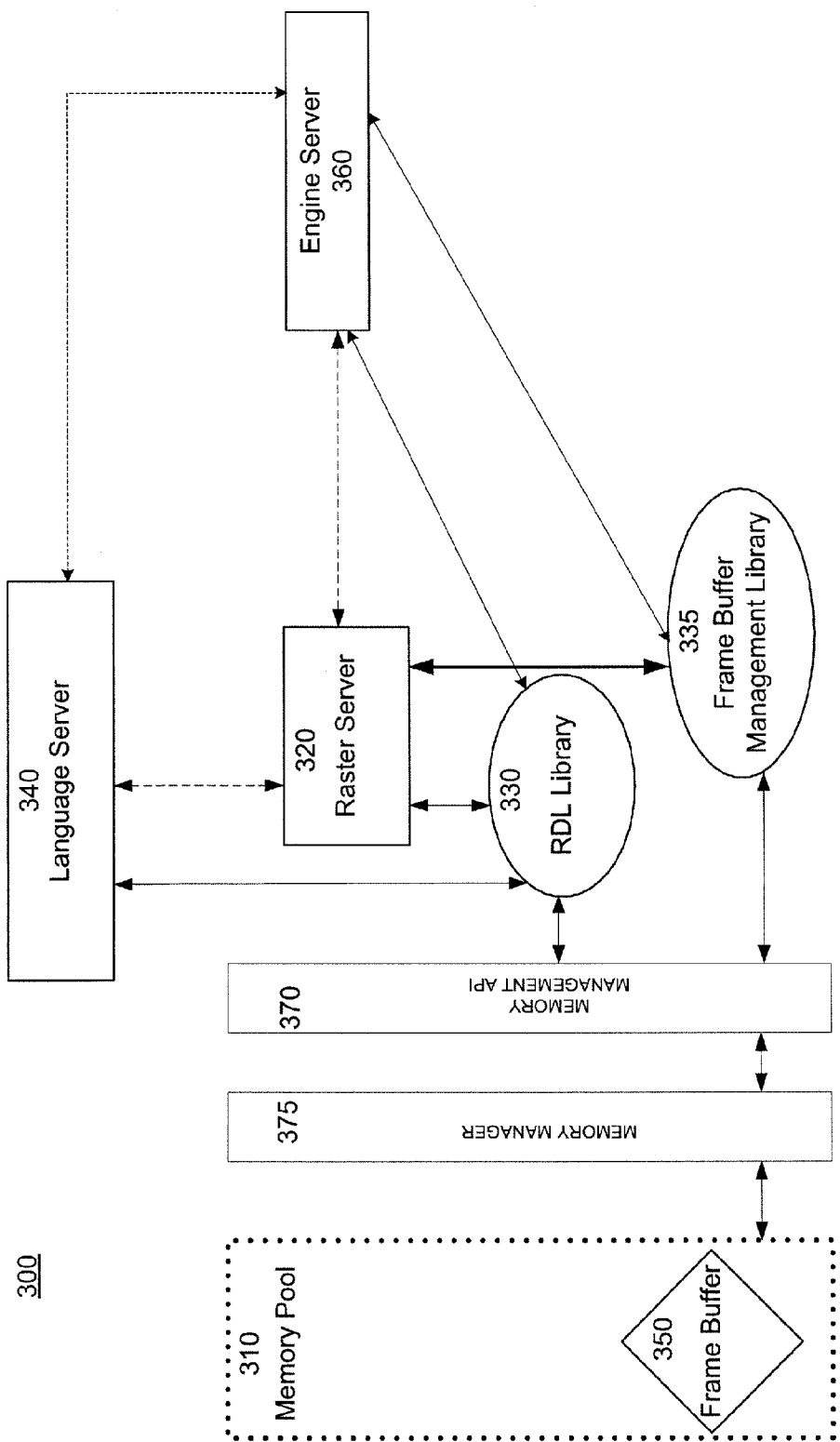
FIG. 3 shows an exemplary high-level architecture of a system for management of memory pools.

FIG. 3 shows an exemplary high-level architecture of a system 300 for management of memory pools. As shown in FIG. 3, language server 340, engine server 360, and raster server 320 may communicate with each other. In addition, language server 340, engine server 360, and raster server 320 may invoke routines and communicate with RDL library 330. The system may also include Frame Buffer Management library 335, which communicates with raster server 320, engine server 360, and Memory Management Application Programming Interface (API) 370. In some embodiments, use of functionality provided by memory manager 375 may occur through a Memory Management Application Programming Interface (API) 370. Memory manager 375 defines the functions of the Memory Management API 370. In some embodiments, code pertaining to display lists and the frame buffer 350, such as code in Frame Buffer library 335, interface with memory manager 375 through Memory Management API 370. Accordingly, in these embodiments, the memory manager can be replaced or easily modified by a product-specific memory manager without changing program code used to manage and/or manipulate the display list or frame buffer. In some embodiments, the display list may include commands defining data objects and their contexts within a document or a page within the document to be printed. These display commands may include data comprising characters or text, line drawings or vectors, and images or raster data.

In some embodiments, the display list may be dynamically reconfigurable and is termed a Reconfigurable Display List ("RDL"). In one embodiment, an RDL may be implemented using a data structure that allows certain display list objects to be stored in a manner that allows their manipulation dynamically. For example, image objects may be compressed in place to increase the amount of available memory, and decompressed when referenced and/or used. In some embodiments, an RDL may also permit RDL objects to be stored in memory and/or secondary storage by holding pointers, offsets, or addresses to the actual locations of RDL objects, which can then be retrieved when referenced and/or used. In general, the RDL allows display list objects to be flexibly stored and manipulated based on system constraints and parameters.

In one embodiment, the translation of a POL description of a document into a display list and/or ROL representation may be performed by language server 340 using routines in ROL library 330 and memory manager 375. For example, language server 340 may take POL language primitives and transform these into data and graphical objects and add these to the reconfigurable display list using the capability provided by functions in ROL library 330 and memory manager 375. In some embodiments, access to functions and routines in memory manager 375 may be provided through a memory management API 370. In some embodiments, the display list may be stored and manipulated in a dynamically allocated memory pool such as exemplary memory pool 310, which may be part of memory 172.

In some embodiments, creation of the RDL may be an intermediate step in the processing of data prior to actual printing. The RDL may be parsed before conversion into a subsequent form. In some embodiments the subsequent form may be a final representation, and the conversion process may be referred to as rasterizing the data. In some embodiments rasterization may be performed by raster server 320 using routines in frame buffer management library 335. Upon rasterization, the rasterized data may be stored in frame buffer 350, which may be part of memory pool 310, using routines in memory manager 375, which may be accessed through memory management API 370. In some embodiments, the rasterized data may take the form of a bitmap that specifies the marks to be made on a printed page.

In one embodiment, routines in memory manager 375 may manage some subset of available memory in memory 172 as memory pool 310 and allocate memory from memory pool 310 to requesting processes through memory management API 370. In some embodiments, memory manager 375 interacts with memory management API, and access to functionality provided by memory manager 370 occurs through memory management API 370. When memory is no longer needed by the requesting processes, the memory may be de-allocated and returned to memory pool 310, where it can be made available to other processes. In some embodiments, routines in memory manager 370 may also include various other memory management routines, including routines to free memory, routines to recover memory, and swapping routines that can swap memory to secondary storage 173. In some embodiments, frame buffer 350 may also be a part of memory pool 310 and may be managed by memory manager 370. For example, calls to functions in frame buffer management library 335, may result in calls to functions in memory management API 370. Memory management API may then invoke one or more functions in memory manager 370. Results of the actions taken by memory manager 375 may be routed back to the calling process. In one embodiment, frame buffer 350 may be allocated an initial contiguous block of memory and subsequent memory blocks may be allocated to frame buffer 350 when requested. Memory blocks may also be allocated for other non frame-buffer purposes from memory pool 310. In some embodiments, distinct memory blocks assigned to the frame buffer 350 or to other processes may occupy non-contiguous memory locations in memory 172.

Print engine 177, may process the rasterized data in frame buffer 350, and form a printable image of the page on a print medium, such as paper using routines in frame buffer library 335. In some embodiments, raster server 320 and engine server 360 may also use routines in RDL library 330 to perform their functions. In some embodiments, engine server 360 may provide control information, instructions, and data to print engine 177. In some embodiments, engine server 360 may invoke routines that lead to freeing memory used by display list objects after processing for return to memory pool 320, using functionality provided by memory manager 375, through frame buffer library and memory management API 370. In some embodiments, portions of RDL memory pool and/or frame buffer 350 may reside in memory 172 or secondary storage 173. In some embodiments, routines for language server 340, raster server 320, and engine server 360 may be provided in firmware 171 or may be implemented using ASICs/FPGAs 178.

Figure 4:
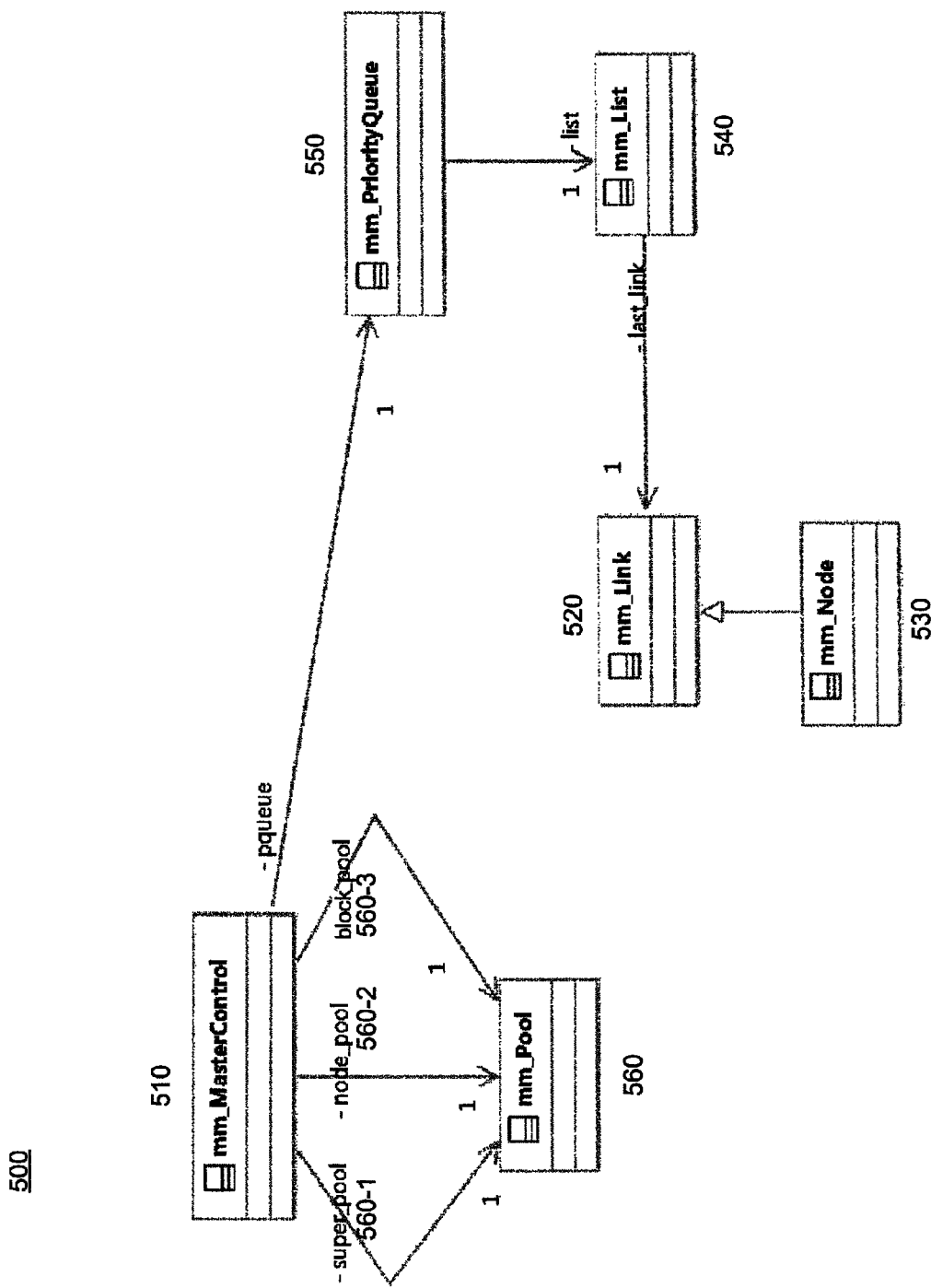
FIG. 4 shows an exemplary class hierarchy for management of memory pool 310.

FIG. 4 shows a portion of an exemplary class diagram 500 in an exemplary object oriented implementation of a system for managing memory pools during rasterization. The class structure includes persistent singleton mm_Master_Control 510. Declaring mm_Master Control 510 as a persistent singleton ensures that there is a single instance of mm_Master Control, that its identity does not change during code execution, and that there is a global point of access to mm_Master Control 510. Classes, sub-classes, and/or objects 520 through 560 indicate one implementation of a system for memory management during rasterization. Objects belonging to the various classes may be instantiated during execution.

As shown in FIG. 4, mm_Master Control 510 includes three objects of class mm_Pool 560. These objects comprise node objects, block objects, and super-block objects. These mm_Pool objects can be used in the management of shared memory pool 310. For example, memory pool 310 could be logically viewed as comprising of super-block pool 560-1, node pool 560-2, and block-pool 560-3. Accordingly, super-block pool 560-1, node pool 560-2, and block-pool 560-3 are sub-pools of memory pool 310. Further, each sub-pool can comprise objects local to that sub-pool. The use of the term "local" with objects serves solely to associate objects with their respective pools for descriptive purposes. Accordingly, a super-block object can be local to super-block pool 560-1, while a node object can be local to node pool 560-2, whereas a block object can be local to block-pool 560-3. For example, routines in frame buffer management library 335 associated with frame buffer 350 can request a super-block from super-pool 560-1 using memory manager 375 through memory management API 370. Similarly, a block object may be requested by RDL from block-pool 560-3 mm_Node objects 530 can be allocated by Memory Manager 575 from node_pool 560-2 upon request to manage block and super-block allocations. In one embodiment, one mm_Node object 530 may be used per block or super-block allocation. In some embodiments, each individual object may comprise a discrete contiguous section of memory.

In some embodiments, mm_Master Control 510 can also include an mm_PriorityQueue object 550. As shown in FIG. 4, mm_PriorityQueue object 550 can include an mm_List object 540. Further, mm_List object 540 holds mm_Node objects 530 using mm_Link objects 520. In some implementations, an mm_Node object 530 keeps track of each allocated block or super-block. mm_PriorityQueue object 550 can be used to keep track of swappable blocks. When available memory is low and swapping can be used, mm_Priority-Queue object 550 can be used to determine an order for swapping blocks out of memory. For example, an allocated block can be associated with a priority. For example, the priority may be an indication of performance advantage gained by keeping block readily accessible. In one embodiment, mm_PriorityQueue object 550 may order objects in order of increasing priority thereby allowing low priority blocks to be swapped out earlier than higher priority blocks. Other functions and routines may use the priority number to keep one or more higher priority chunks of memory in a quickly accessible form.

Figure 5:
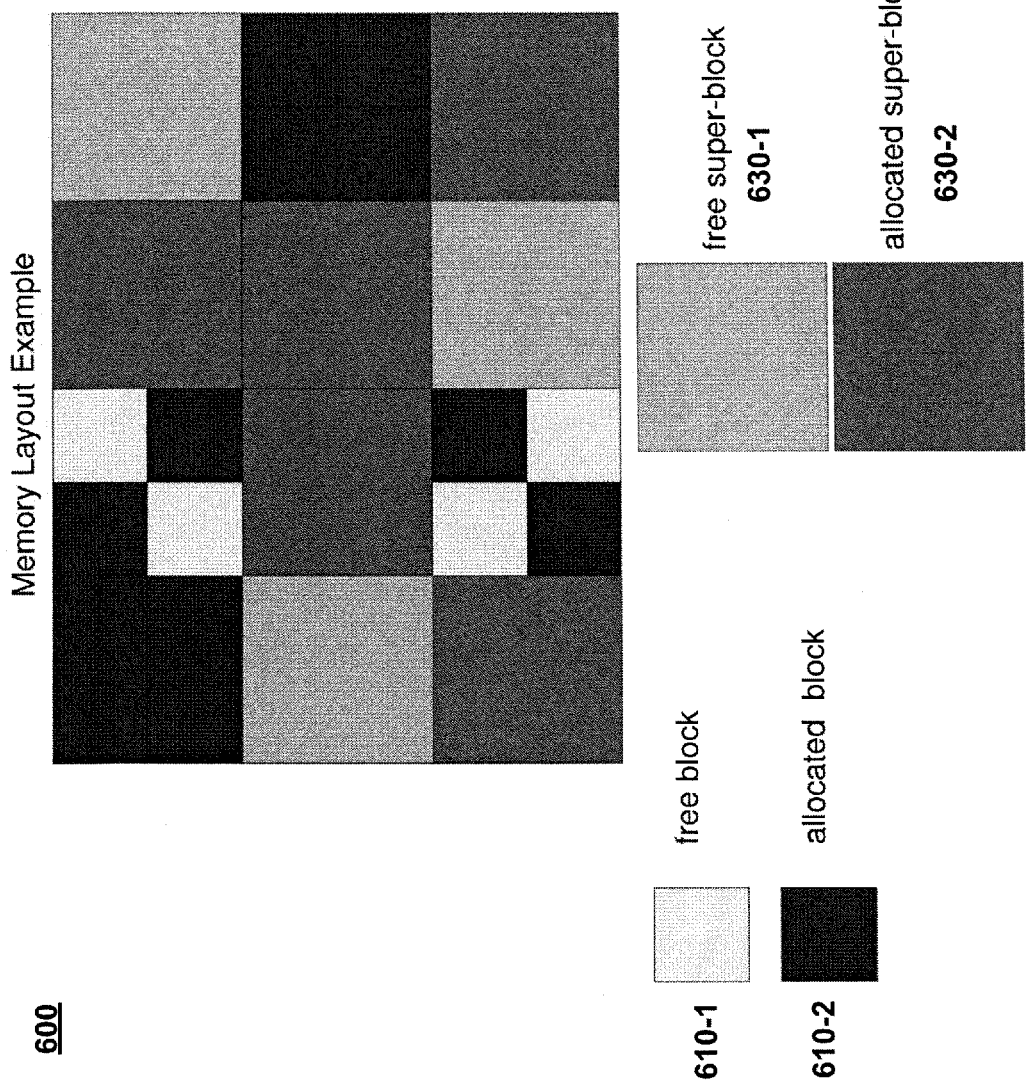
FIG. 5 shows a snapshot illustrating an exemplary allocation of memory during rasterization.

FIG. 5 shows a snapshot 600 illustrating an exemplary allocation of memory pool 310 during rasterization. At various points during rasterization, memory pool 310 may comprise of some combination of free super-blocks 630, allocated super-blocks 630-2, free blocks 610-1, and allocated blocks 610-2. From a logical perspective, memory pool 310 may be viewed initially as a collection of free super-blocks 630-1, node-blocks, and free blocks 610-1. In some embodiments, all super-block objects may be a uniform, fixed size. In some embodiments, block objects may also be a uniform, fixed size. In some embodiments, the uniform, fixed size of block objects may be smaller and different from the size of super-block objects. In some embodiments, the size of a super-block object may be an integral multiple of the size of block objects. In some embodiments, the size of a super-block object may be an even numbered integral multiple of the size of block objects. For example, as shown in FIG. 5, the size of super-block 630 may be equal to that of four blocks 610.

When memory is requested for use by frame buffer 350, such as for storing a bitmap, a super-block 630-1 can be allocated. When memory is requested for an RDL, or for temporary storage and processing purposes, a smaller unit of memory may be allocated. For example, a free super-block 630-1 can be divided into equally sized blocks 610 and one of these blocks 610 can be allocated when used for an RDL, or for temporary storage and processing purposes. The use of super-block pool 560-1, node pool 560-2, and block-pool 560-3, in part, allows control over the granularity of memory allocation. Node-pool 560-1 and block-pool 560-3 can grow when they allocate memory from super-block pool 560-1. In some embodiments, memory defragmentation routines may be employed periodically, or when available memory is below some threshold, or as a strategy to free memory, in order to create new super-blocks from disparate scattered blocks in memory pool 310.

Figure 6:
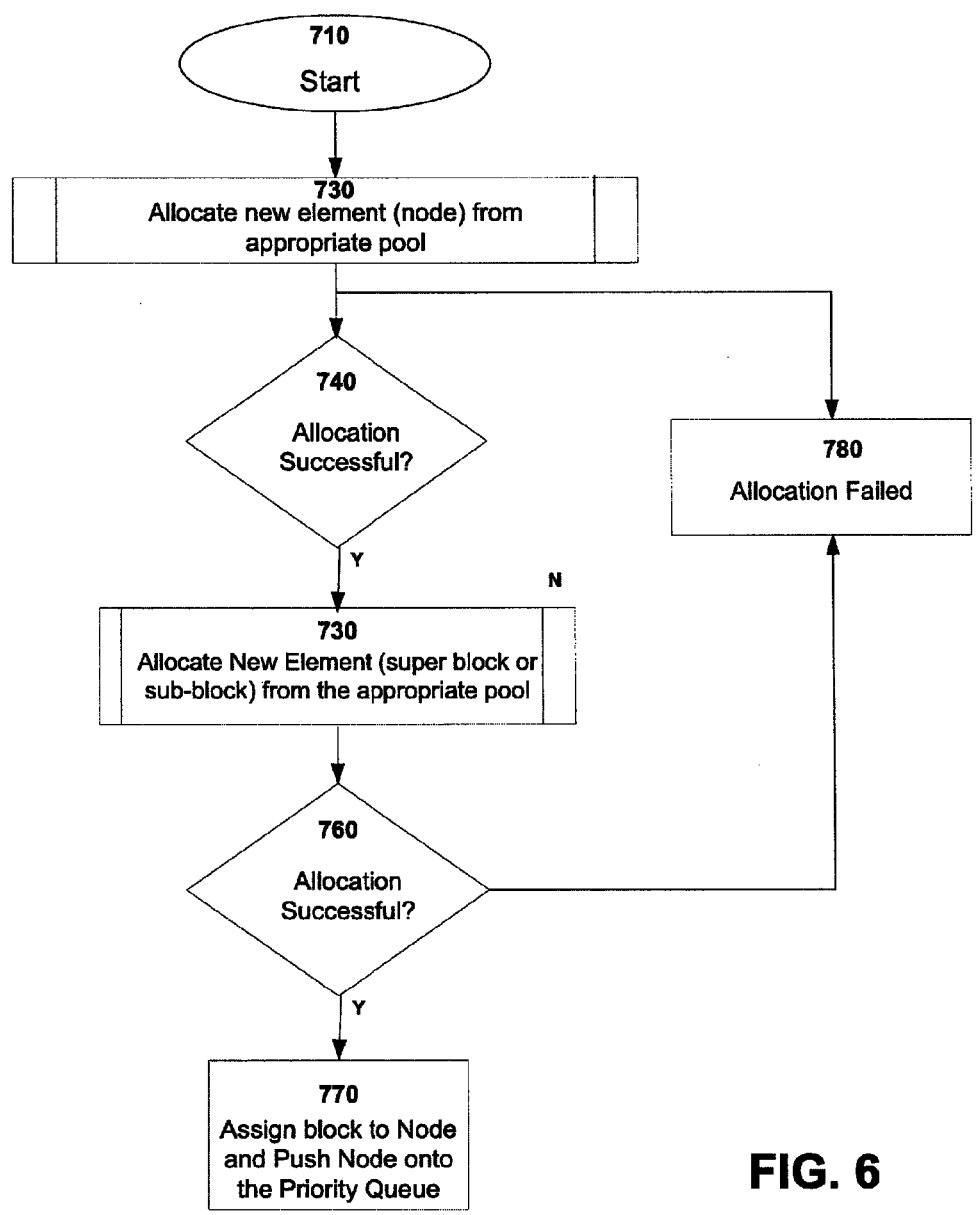
FIG. 6 shows an exemplary flowchart 700 of an algorithm for the allocation of new blocks from memory pool 310.

FIG. 6 shows an exemplary flowchart 700 of an algorithm for the allocation of new blocks 610-1 from memory pool 310. In step 710, the algorithm may be invoked. Next, in predefined routine 730, a new node object may be allocated from node pool 560-2. In some embodiments, the allocation of memory for a new object may be performed using a generic pre-defined routine to allocate new elements. Pre-defined routine 730 may use supplied parameters to determine the appropriate memory pool 560 and the corresponding object to be allocated. For example, pre-defined routine 730 may allocate a new node from node pool 560-2. If the allocation is determined to be successful in step 740, then a new super-block 630-1 or block 610-1 may be allocated using pre-defined routine 730 with a different set of parameters. For example, pre-defined routine 730 may allocate a new super-block 630-1 from the super-block pool 560-3, if the memory is being used by frame buffer 350 to store bitmaps. If the allocation is determined to be successful in step 760, then the newly allocated block 610-2 may be assigned to a node and the node may be placed in a priority queue in step 770. In some embodiments, the node may be linked to mm_Priority-Queue object 550. If the allocations using pre-defined routine 730 are unsuccessful, then the algorithm may proceed to step 780, where an "allocation failed" message may be sent back to the calling routine.

Figure 7:
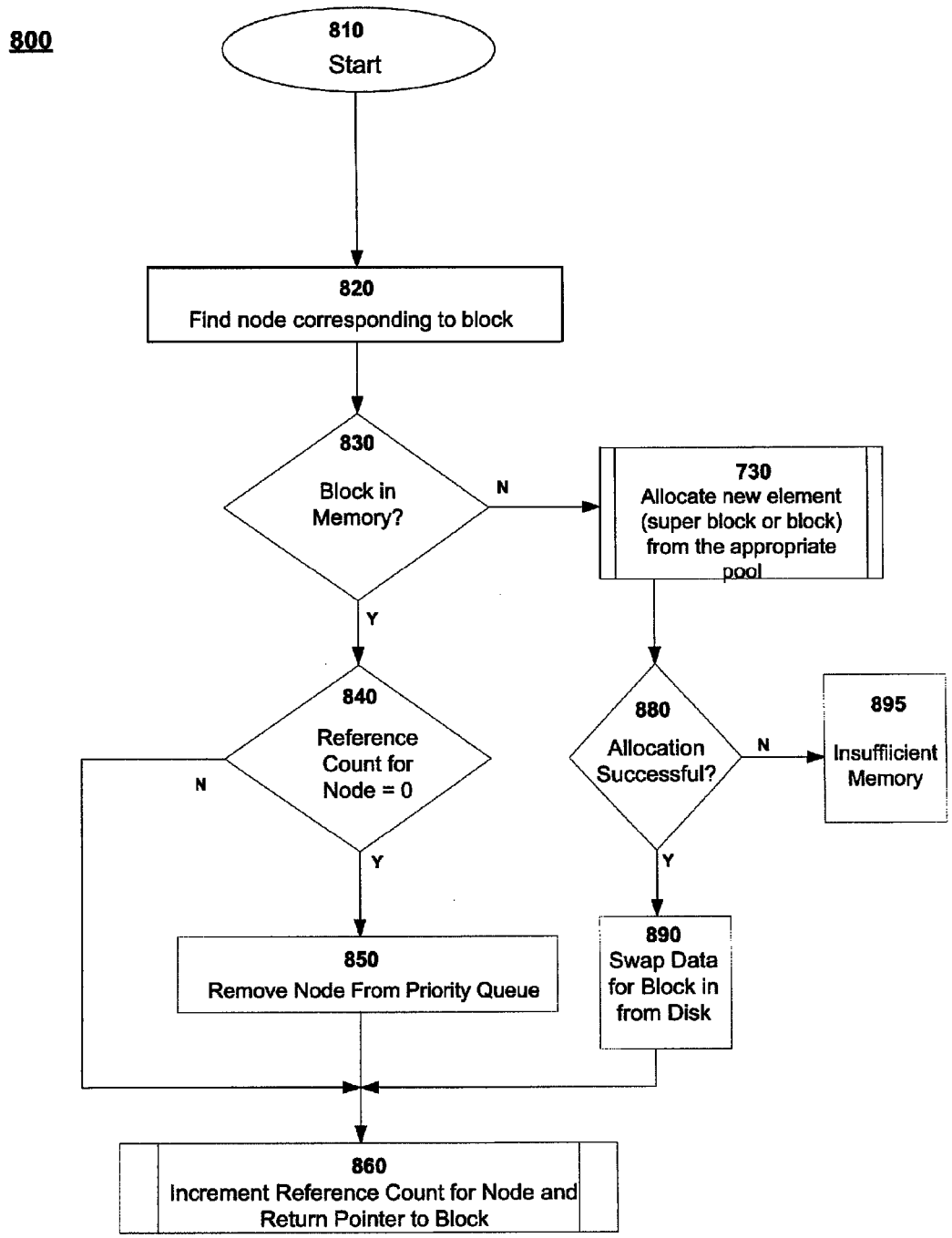
FIG. 7 shows a flowchart illustrating steps performed in an exemplary method to get a pointer to an allocated block.

FIG. 7 shows a flowchart 800 illustrating steps performed in an exemplary method to get a pointer to allocated block 610-2. In step 810, the algorithm may be invoked. Next, in step 820, the node corresponding to allocated block 610-2 can be determined. If block 610-2 is in memory and the reference count for the node corresponding to block 610-2 is zero, as determined in steps 830 and 840, respectively, then, in step 850, the node may be removed from the priority queue. In some embodiments, appropriate actions may be performed on mm_PriorityQueue object 550 to achieve removal of the node.

If block 610-2 is not in memory, as may be determined in step 830, then pre-defined routine 730 may use supplied parameters to determine the appropriate memory pool 560 and the corresponding super-block or block object to be allocated. Next, if the object allocation is successful, as can be determined in step 880, then, in step 890, data for block 610-2 may be read or swapped in from secondary storage 173 and the algorithm proceeds to step 860. In step 840, if the reference count for the node is non-zero, then the algorithm can proceed to step 860. In step 860, the reference count for the node may be incremented by one and a pointer to block 610-2 can be returned. If memory allocation by pre-defined routine 730 is determined to be unsuccessful, in step 880, then an "insufficient memory" message may be sent back to the calling routine, in step 895.

Figure 8:
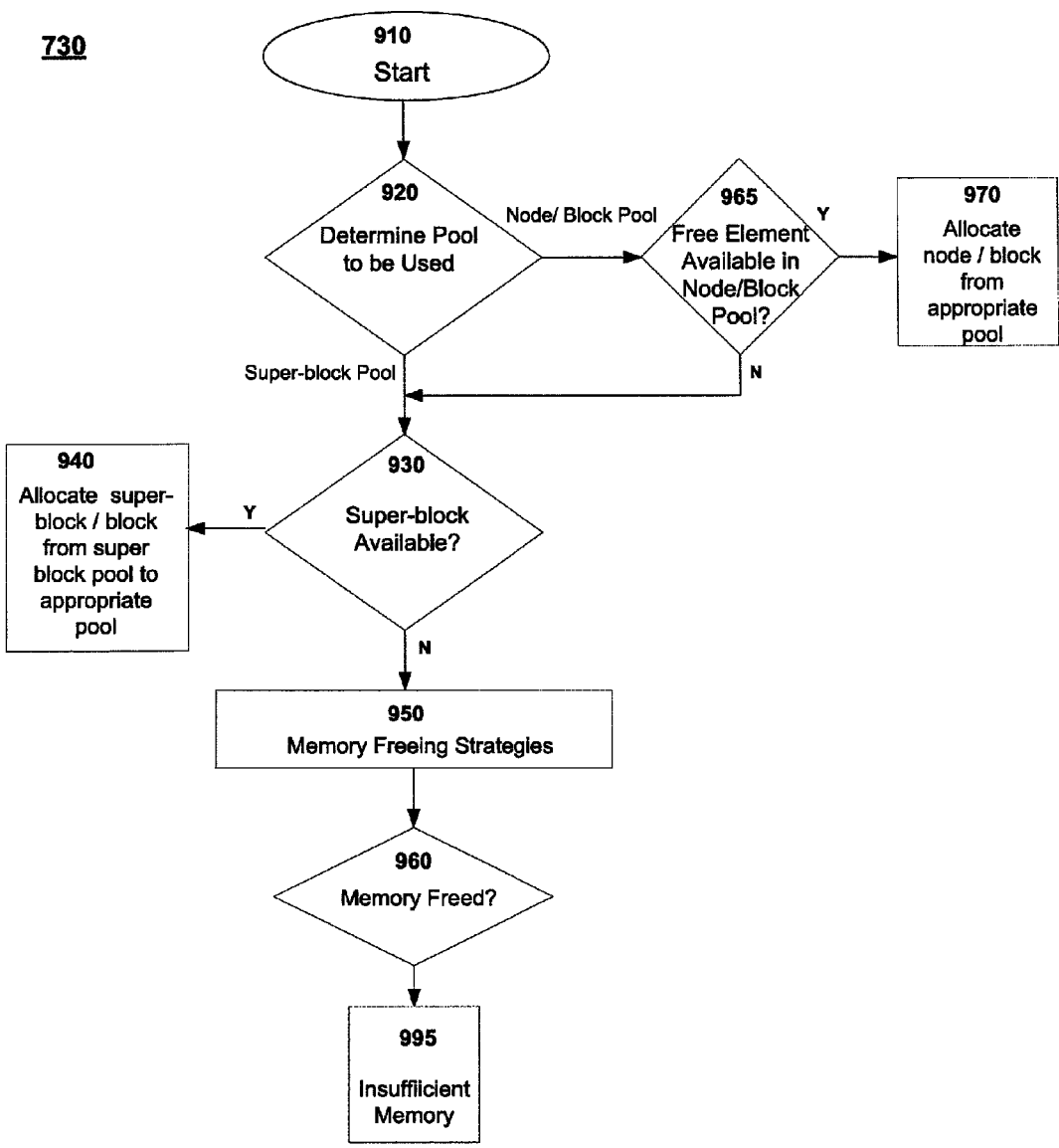
FIG. 8 shows a flowchart for exemplary pre-defined routine 730 to determine the appropriate memory pool and the corresponding object to be allocated.

FIG. 8 shows a flowchart for an exemplary pre-defined routine 730 to determine the appropriate memory pool and the corresponding object to be allocated. In step 910, the algorithm may be invoked. Next, in step 920, the sub-pool to be used can be determined. In some embodiments, the sub-pools may be super-block pool 560-1, or one of node pool 560-2 and block-pool 560-3. If an allocation request is made to super-block pool 560-1, then in step 930, the availability of a super-block 630-1, in super-block pool 560-1 can be determined. If a super-block 630-1 is available, then super-block 630-1 can be allocated in step 940. For example, a super-block 630-1 may be allocated to routine associated with frame buffer 350.

If a request for a block 610-1 is made to node pool 560-2 or to block pool 560-3, then in step 965, the availability of a free or unallocated elements or allocation units in node-pool 560-2 or block pool 560-3 can be determined. If a node object or a block 610-1 is available, then a node object or a block 610-1 can be allocated in step 970 based on the type of object requested. For example, a node object may be allocated for internal use by memory manager 375. If the check for availability in step 965 determines that there are no free or unallocated elements in node-pool 560-2 or block pool 560-3, then the algorithm proceeds to step 930. In step 930, the availability of a super block 630-1, in super-block pool 560-1 can be determined. If a super-block 630-1 is available, then a super-block can be divided into blocks 610-1 and allocated to the appropriate pool 560-2 or 560-3, in step 940. For example, a super-block 630-1 may be divided into blocks 610-1 and one block 610-1 may be allocated to RDL.

If there are no super-blocks 630-1 available in super-block pool 560-1, then the algorithm may invoke one of several memory freeing strategies, in step 950. For example, the algorithm may wait until a memory is freed by another process. In some embodiments, the algorithm may swap a node with a low priority from the priority queue to secondary storage 173. If memory freeing strategies fail, as may be determined in step 960, then the algorithm may report insufficient memory to the calling process in step 995.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method for managing a single memory pool that is used by a printing system that comprises a language server and a raster server, wherein the language server is for generating display lists from a document in a page description language and storing the display lists in a display list memory provided in the single memory pool, and the raster server is for rasterizing the display lists stored in the display list memory into a bitmap image and storing the bitmap image in a frame buffer memory provided in the single memory pool, wherein the single memory pool comprises sub-pools including:

a super-block pool comprising a plurality of super-blocks, each of which comprises a contiguous memory section having a first size that is N times of a second size, where N is a positive integer greater than one, the super-block pool being used as the frame buffer memory for storing a plurality of super-block objects;

a node pool comprising a plurality of blocks each of which comprises a contiguous memory section having the second size, the node pool being for storing a plurality of node objects; and a block-pool comprising a plurality of blocks each of which comprises a contiguous memory section of the second size, the block-pool being used as the display list memory for storing a plurality of block objects;

the method comprising:

providing a memory manager for the language server and the raster server; and allocating by the memory manager memory from the single memory pool to the frame buffer memory of the printing system and to the display list memory, upon receiving memory allocation requests from the language server and the raster server, wherein each memory allocation request is directed to at least one of the sub-pools, wherein, for each memory allocation request from the language server or the raster server, the method further comprises:

allocating by the memory manager an object local to the sub-pool identified in the memory request, if the memory manager determines that local objects are available in the sub-pool to satisfy the memory request;

if the memory manager determines that the memory request is directed to the node-pool or the block-pool and there are no available local objects in the respective sub-pool to satisfy the memory request, dividing by the memory manager a super-block by N to create N sets of new blocks, allocating at least one of the new blocks to the respective sub-pool, and allocating the node object or the block object from the respective sub-pool to the frame buffer memory; and applying by the memory manager a defragmentation routine to the single memory pool that includes the sub-pools, and creating new super-blocks from blocks of the second size in the single memory pool.

2. The method of claim 1, wherein:

the super-block pool comprises of integral number of uniformly-sized super-block objects;

the block pool comprises of integral number of uniformly-sized block objects; and the size of a super-block object is an integral multiple of the size of a block-object.

3. The method of claim 2, wherein the size of a super-block object is an even-numbered integral multiple of the size of a block-object.

4. The method of claim 1, wherein the plurality of memory recovery strategies comprise of at least one of:

waiting for allocated block objects resident in the single memory pool to be freed;

defragmenting at least one of the node-pool and the block-pool; and swapping block objects resident in the single memory pool to a secondary storage.

5. The method of claim 1, wherein the size of the super-blocks can be chosen from one of several pre-determined sizes.

6. The method of claim 1, wherein the single memory pool is resident on a printing device.

7. The method of claim 4, wherein the order in which block objects resident in the single memory pool are swapped to the secondary storage is based on a priority associated with a node object corresponding to the block objects.

8. The method of claim 1, wherein the method is invoked using an Application Programming Interface.

9. The method of claim 1, wherein requests for the frame buffer memory of the printing system are directed to the super-block pool of the single memory pool.

10. The method of claim 1, wherein requests for the display list memory of the printing system are directed to the block-pool of the single memory pool, wherein the block-pool is created by dividing one or more super-blocks into a plurality of blocks.

11. A non-transitory computer-readable medium that stores instructions, which when executed by a processor perform a method for managing a single memory pool that is used by a printing system that comprises a language server and a raster server, wherein the language server is for generating display lists from a document in a page description language and storing the display lists in a display list memory provided in the single memory pool, and the raster server is for rasterizing the display lists stored in the display list memory into a bitmap image and storing the bitmap image in a frame buffer memory provided in the single memory pool, wherein the single memory pool comprises sub-pools including:
    a super-block pool comprising a plurality of super-blocks each of which is constituted by a contiguous memory section having a first size that is N times of a second size, where N is a positive integer greater than one, the super-block pool being used as the frame buffer memory for storing a plurality of super-block objects;
    a node pool comprising a plurality of blocks each of which is constituted by a contiguous memory section having the second size, the node pool being for storing a plurality of node objects; and
    a block-pool comprising a plurality of blocks each of which is constituted by a contiguous memory section of the second size, the block-pool being used as the display list memory for storing a plurality of block objects;
the method comprising:
    providing a memory manager for the language server and the raster server; and
    allocating by the memory manager memory from the single memory pool to the frame buffer memory of the printing system and to the display list memory, upon receiving memory allocation requests from the language server and the raster server, wherein each memory allocation request is directed to at least one of the sub-pools,
    wherein, for each memory allocation request from the language server or the raster server, the method further comprises:
    allocating by the memory manager an object local to the sub-pool identified in the memory request, if the memory manager determines that local objects are available in the sub-pool to satisfy the memory request;
    if the memory manager determines that the memory request is directed to the node-pool or the block-pool and there are no available local objects in the respective sub pools sub-pool to satisfy the memory request, dividing by the memory manager a super-block by N to create N sets of new blocks and allocating at least one of the new blocks to the respective sub-pool, and allocating the node object or the block object from the respective sub-pool; and
    applying by the memory manager a defragmentation routine to the single memory pool that includes the sub-pools, and then creating new super-blocks from blocks of the second size in the single memory pool.

12. The non-transitory computer-readable medium of claim 11, wherein:
    the super-block pool comprises an integral number of uniformly-sized super-block objects;
    the block pool comprises an integral number of uniformly-sized block objects; and
    the size of a super-block object is an integral multiple of the size of a block-object.

13. The non-transitory computer-readable medium of claim 12, wherein the size of a super-block object is an even-numbered integral multiple of the size of a block-object.

14. The non-transitory computer-readable medium of claim 11, wherein the plurality of memory recovery strategies comprise of at least one of:
    waiting for memory resident block objects to be freed;
    defragmenting at least one of the node-pool and the block-pool; and
    swapping block objects resident in the single memory pool to a secondary storage.

15. The non-transitory computer-readable medium of claim 11, wherein the memory pool is resident on a printing device.

16. The non-transitory computer-readable medium of claim 14, wherein the order in which block objects resident in the single memory pool are swapped to the secondary storage is based on a priority associated with a node object corresponding to the block objects.

17. The non-transitory computer-readable medium of claim 11, wherein the method is invoked using an Application Programming Interface.

18. A memory management system for managing a single memory pool that is used by a printing system that comprises a language server and a raster server, wherein the language server is for generating display lists from a document in a page description language and storing the display lists in a display list memory provided in the single memory pool, and the raster server is for rasterizing the display lists stored in the display list memory into a bitmap image and storing the bitmap image in a frame buffer memory provided in the single memory pool, wherein the single memory pool comprises sub-pools including:
    a super-block pool comprising a plurality of super-blocks each of which is constituted by a contiguous memory section having a first size that is N times of a second size, where N is a positive integer greater than one, the super-block pool being used as the frame buffer memory for storing a plurality of super-block objects;
    a node pool comprising a plurality of blocks each of which is constituted by a contiguous memory section having the second size, the node pool being for storing a plurality of node objects; and
    a block-pool comprising a plurality of blocks each of which is constituted by a contiguous memory section of the second size, the block-pool being used as the display list memory for storing a plurality of block objects;
the memory management system comprising a memory manager provided for the language server and the raster server and for:
    allocating by the memory manager memory from the single memory pool to the frame buffer memory of the printing system and to the display list memory, upon receiving memory allocation requests from the language server and the raster server, wherein each memory allocation request is directed to at least one of the sub-pools,
    wherein, for each memory allocation request from the language server or the raster server, the system further comprises:

allocating by the memory manager an object local to the sub-pool identified in the memory request, if the memory manager determines that local objects are available in the sub-pool to satisfy the memory request;

if the memory manager determines that the memory request is directed to the node-pool or the block-pool and there are no available local objects in the respective sub-pool to satisfy the memory request, dividing by the memory manager a super-block by N to create N sets of new blocks and allocating at least one of the new blocks to the respective sub-pool, and allocating the node object or the block object from the respective sub-pool; and applying by the memory manager a defragmentation routine to the single memory pool that includes the sub-pools, and then creating new super-blocks from blocks of the second size in the single memory pool.

19. The memory management system of claim 18, wherein the memory manager is further for directing requests for the frame buffer memory of the printing system to the super-block pool of the single memory pool and directing requests for the display list memory of the printing system to the block-pool of the single memory pool.

20. The memory management system of claim 18, wherein the plurality of memory recovery strategies comprise of at least one of:

waiting for allocated block objects resident in the single memory pool to be freed;

defragmenting at least one of the node-pool and the block-pool; and swapping block objects resident in the single memory pool to a secondary storage.

21. The method of claim 1, wherein the frame buffer memory is for storing rasterized data and the display list memory is for storing intermediate data.

22. The non-transitory computer-readable medium of claim 11, wherein the frame buffer memory is for storing rasterized data and the display list memory is for storing intermediate data.

23. The memory management system of claim 18, wherein the frame buffer memory is for storing rasterized data and the display list memory is for storing intermediate data.

* * * * *